Dec. 14, 1926.
H. A. DOUGLAS
1,610,495
TRANSMISSION MECHANISM LOCKING APPARATUS
Filed June 27, 1925      3 Sheets-Sheet 3
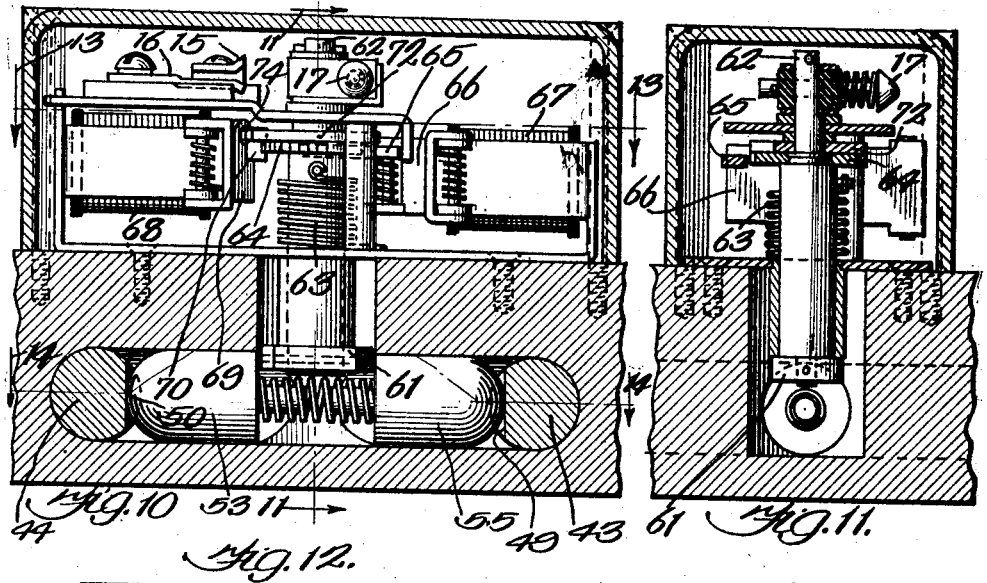
Inventor:
Harry A. Douglas Patented Dec. 14, 1926.

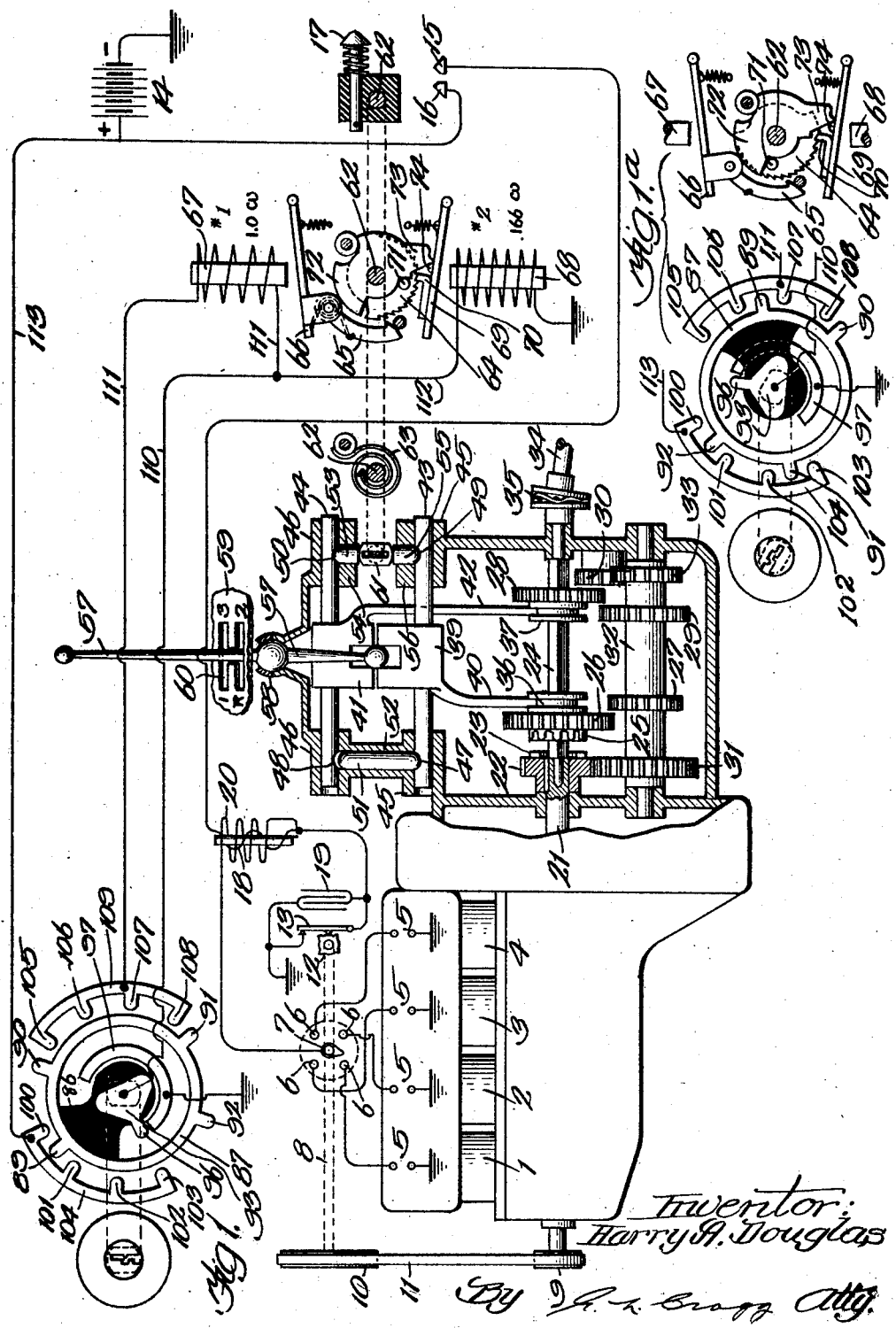

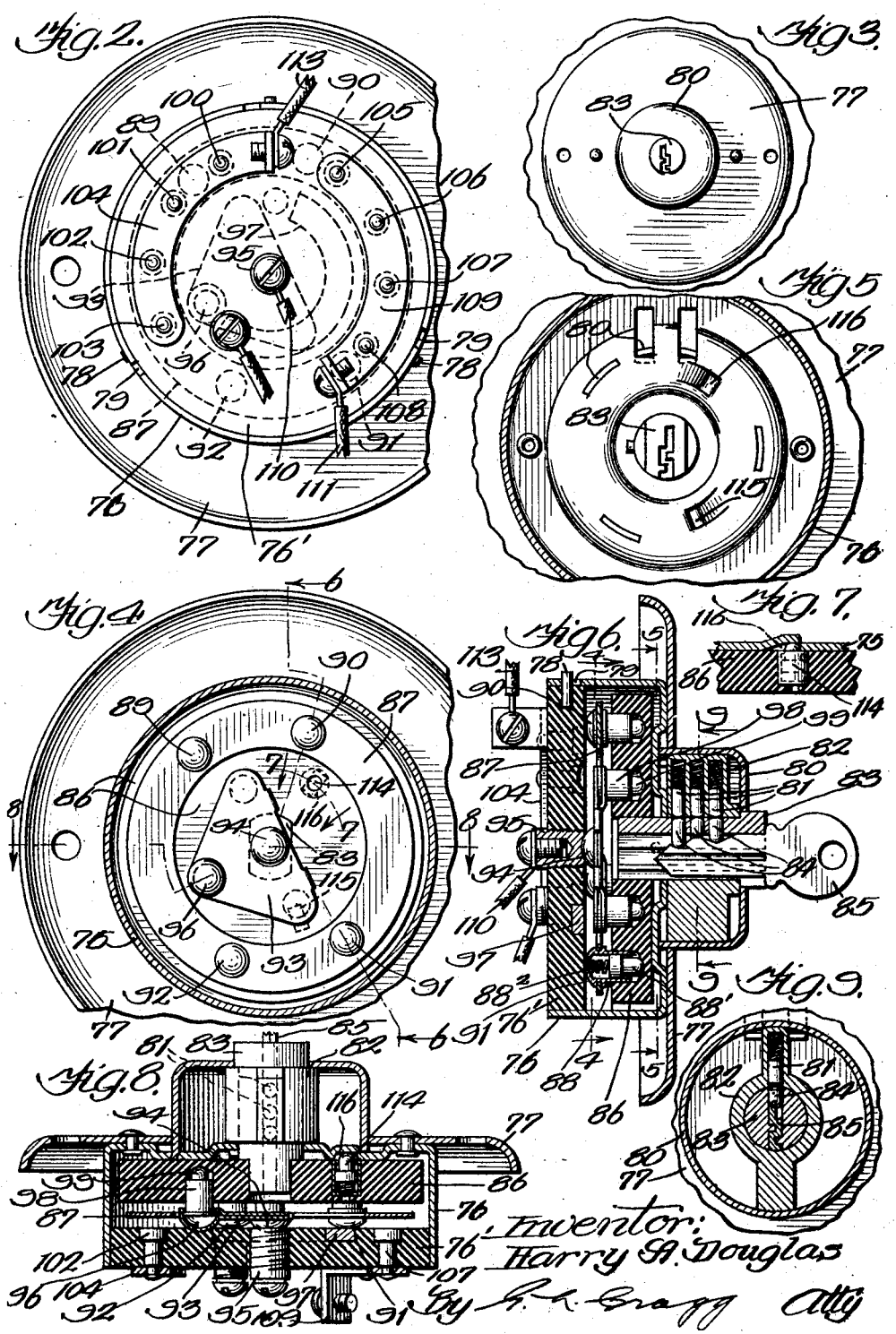

1,610,495

UNITED STATES PATENT OFFICE.

HARRY A. DOUGLAS, OF BRONSON, MICHIGAN.

TRANSMISSION-MECHANISM-LOCKING APPARATUS.

Application filed June 27, 1925. Serial No. 40,080.

My invention relates to power transmission mechanism having driving and driven shafts which are separably coupled by means of complemental gears, one individual to and connected with each shaft, and one being shiftable into and out of connection with the other. My invention has for its general object the provision of means for locking the complemental gears, aforesaid, in disconnected relation, so that the two shafts may not be brought into connection by any one that is unauthorized. The apparatus of my invention is of particular utility in connection with automobiles which are driven by internal combustion hydrocarbon engines, the equipment of my invention being capable of employment to hold the transmission gears in neutral position and to prevent the unauthorized coupling thereof to guard an automobile equipped with the invention from theft. I also provide a switching device in the ignition circuit of the internal combustion engine which is employed to drive the shafts, this switching device being arranged to be held open by the mechanism pertaining to the gearing when the complemental gears are disconnected to afford additional protection against the unauthorized use of the automobile.

In my copending application Serial No. 40,079 filed June 27, 1925, I have disclosed mechanism having electromagnets which take part in accomplishing the general objects of my present invention.

In the mechanism of my said copending application the device which is employed to hold the complemental gears disconnected is itself held in functioning position by a holding device which is operable step by step to a releasing position, the number of steps required to release the step by step adjustable holding device being unknown except to the operator of the automobile and those in confidence with him. The mechanism for initially locking the complemental gears in disconnected relation is electromagnetic and the mechanism for permitting the meshing of the complemental gears is also electromagnetic.

In the mechanism of my present invention there is also an unlocking magnet operable the predetermined number of times for permitting the complemental gears to have meshing engagement, and there is a locking magnet for preventing these gears from meshing. Mechanical means are employed for also preventing the complemental gears from meshing, which mechanical means is operable by the unlocking magnet when this unlocking magnet has been energized more than the predetermined number of times, as is apt to be the case when an unauthorized person seeks to secure control of the automobile. This mechanical means desirably operates the armature of the locking magnet to place this armature in its attractive position, in which position mechanically operated locking means is permitted to function.

In accordance with another feature of my present invention the mechanically operated locking means is inclusive of a rotatable positioner adapted in one position of rotary adjustment to permit the complemental gears to have meshing relation and in another position of rotary adjustment to prevent the complemental gears from having meshing relation.

Where the transmission mechanism is employed to couple an internal combustion hydro-carbon engine with the load to be driven thereby, I also employ an ignition switch which is coupled with the mechanism operated by the unlocking magnet in a manner to enable the ignition circuit to be closed when the complemental gears are permitted to mesh.

The invention in its foregoing and other characteristics will be fully set forth in connection with the accompanying drawings in which Fig. 1 is a diagrammatic illustration of the preferred embodiment of the invention as employed in connection with an automobile; Fig. 1ª is a diagrammatic view illustrating some of the parts shown in Fig. 1 in changed positions; Fig. 2 is a rear view of the preferred form of switch which controls the circuits of the magnets; Fig. 3 is the front view of the switch with parts broken away; Fig. 4 is a sectional view on line 4—4 of Fig. 6, of the switch; Fig. 5 is a sectional view on line 5—5 of Fig. 6; Fig. 6 is a sectional view of the switch on line 6—6 of Fig. 4; Fig. 7 is a detail view of a part of the switch structure taken on line 7—7 of Fig. 4; Fig. 8 is another axial sectional view of the switch on line 8—8 of Fig. 4; Fig. 9 is a sectional view of a part of the switch structure taken on line 9—9 of Fig. 6; Fig. 10 is a view partially in elevation and partially in section illustrative of the self operating mechanical means which serves when free to function to prevent the complemental gears from meshing, the locking and releasing magnets and associated mechanism being also illustrated; Fig. 11 is a sectional view on line 11—11 of Fig. 10; Fig. 12 is an end view, with a small portion in section, illustrating the ignition switch; Fig. 13 is a sectional view on line 13—13 of Fig. 10; Fig. 14 is a sectional view on line 14—14 of Fig. 10; and Fig. 15 is a sectional view taken on line 15—15 of Fig. 13.

The power plant illustrated includes an internal combustion engine having four cylinders, 1, 2, 3, and 4, each cylinder having an ignition circuit inclusive of the sparking terminals 5, each included in a conductor grounded at one end and connected with a contact 6 at its other end. The four contacts 6 of the four ignition circuits are arranged in a circular row which is concentric with a revoluble switching arm 7 adapted to engage the contacts 6 in succession. The switch arm 7 is carried upon a shaft 8 which is driven by the engine through the intermediation of an engine driven pulley 9 and a pulley 10 driven by the pulley 9 through the intermediation of a belt 11. The shaft 8 also carries a circuit interrupting cam wheel 12 that serves to vibrate the circuit interrupting switch 13 which is included in an inducing ignition circuit arranged to be supplied with current from the battery or generator 14 of direct current. This inducing circuit may be traced from the battery 14, which is grounded, through the contacts 15 and 16, when these contacts are bridged by the switch member 17, the inducing winding 18, the switch 13, to the grounded contact of this switch. The switch 13 and its contact are desirably shunted by a grounded condenser 19 in accordance with common practice. The switch 7 is in the induced circuit which may be traced from the switch 13 and its grounded contact through the induced coil 20, the switch arm 7, the particular contact button 6 which happens to be engaged by the switch arm 7 to the sparking terminals 5 pertaining to the engaged contact 6.

The pitmen or cranks of the engine directly drive the engine shaft 21 upon which there is keyed a double gear wheel having a spur pinion portion 22 and a crown pinion portion 23. A square shaft 24 has a double gear wheel slidable thereon but turning therewith, this double gear wheel including a crown pinion 25 which is complemental to the crown pinion 23, and may be connected therewith or disconnected therefrom according to the direction in which it is moved along the shaft 24. The spur gear wheel 26 which is in rigid and fixed relation to the crown gear 25, may, with said crown gear, occupy a neutral position or may be connected with a complemental gear 27 when the composite gears 25 and 26 are moved a sufficient distance from the composite gear, 22, 23. Another gear, the spur gear 28, is mounted to slide upon the shaft 24 and to turn therewith, this gear being adapted to mesh alternately with the gears 29 and 30, or to be in a neutral position out of connection with both of these latter two gears. The spur gear 22 is constantly in mesh with a spur gear 31, whereby the shaft 32 is rotated, this shaft carrying the gears 27, 29 and the gear 33 that is in driving relation with the gear 30. The shaft 24 is connected with the shaft 34 through the universal joint 35, this shaft being usually in driving relation with the differential gearing that couples the two sections of the rear propelling axle or shaft of the automobile power plant. The composite gears 25 and 26 are equipped with an annularly grooved collar 36 which is coaxial therewith. A similar annularly grooved collar 37 is coaxial with the spur gear 28. A shifter 39 has a forked arm 40 which enters the groove of the collar 36. Another shifter 41 has an arm 42 which enters the groove of the collar 37. The two shifters 39 and 41 are respectively equipped with rods 43 and 44 which are located abreast and are movable in parallel directions within the parallel guides 45 and 46. The rods are formed with notches 47 and 48 at two of their adjacent ends and with notches 49 and 50 at their remaining ends. A pin 51 is disposed between the rods and is movable transversely thereof within its guide 52. A pin 53 is movable in its guide 54 transversely of the rod 44. A pin 55 is movable in its guide 56 transversely of the rod 43. The pins 53 and 55 are aligned. When the shaft 24 is disconnected from the shaft 21 it is said to be neutral, Fig. 1 illustrating this neutral adjustment which is effected by the gear shifters 41 and 39 that place the gears upon the shaft 24 in the disconnected positions illustrated. The shifters 39 and 41 are to be operated to have different relations with each other to bring about corresponding changes in the relations of the gears upon the shaft 24 to the gears complemental thereto, whereby the shaft 24 and the shaft 34 coupled therewith may not only be at rest according to the adjustment illustrated in Fig. 1, but may be driven at the first, second or third speed forward or in a reverse direction, all as is well understood by those skilled in the art. In accordance with common practice the gear shift lever 57 is common to the gear shifters 39 and 41 and is universally movable upon its ball and socket joint 58 to establish the various relationships of the gear shifters to bring about the various relationships of the different sets of complemental gears. The usual plate 59 with the ordinary H-slot 60 is illustrated for holding the lever in any of its adjustments. The lever is shown in Fig. 1 as being in its neutral position, in which event the pin 51 will not interfere with the movement of either of the rods 43 and 44 inasmuch as this pin is then in line with the notches 47 and 48, the pin being just short enough to barely clear one rod when occupying the corresponding notch in the other rod.

An oblong spreader 61 is interposed between the pins 53 and 55. This spreader is mounted to turn and when it is placed with its curved ends in engagement with the pins 53 and 55, it places these pins in the notches 49 and 50, assuming the lever to be in a neutral position, so that the rods 43 and 44 are both locked. When the spreader is placed with its flat sides between the pins 53 and 55, this spreader and these pins have an aggregate length equal to that of the pin 51, and jointly function similarly to the pin 51, the spreader being free to move bodily in the space between the rods 43 and 44. When the transmission is adjusted to neutral position the pins 53 and 55 are in line with the notches 49 and 50. If it is desired to lock the transmission so that the shaft 24 may not be driven at all or in either direction, the pins 53 and 55 are spread apart by means of the rotatable spreader 61. When these pins are spread apart by the spreader each pin enters its notch in the rod to which it is individual, assuming the gears are in neutral, the spreader holding these pins in their notches so that neither rod may be moved. When the gearing is to be released from its neutral position the spreader is withdrawn, whereupon the pins 53 and 55 permit adjustments in the manner of pin 51.

The spreader is mounted upon a rotatable shaft 62. A coiled spring 63 serves, when free to function, to turn this shaft sufficiently to bring the curved ends of the spreader into engagement with the pins 53 and 55 to place these pins in the corresponding notches in the shaft 44 and 43, when the lever 57 is adjusted to neutral position. The shaft 62 carries an arcuate ratchet 64 which is fixed upon this shaft. This ratchet is arranged to be engaged by a pawl 65 carried upon the armature 66 of an unlocking magnet 67.

The switch, to be hereinafter described, which governs the magnet 67, furnishes eight impulses, the spreader 61 being so shaped that when the ratchet 64 has been turned eight steps the sides of the spreader will be so interposed between the pins 53 and 55 as to permit these pins to function jointly similarly to pin 51, the gear shifting mechanism being then in position to permit the gears to be variously coupled in accordance with common automobile practice. The switching mechanism that governs the unlocking magnet 67 also governs the locking magnet 68, the switch rendering the circuit of the magnet 67 ineffective when it renders the circuit of the magnet 68 effective. When the magnet 68 is energized it attracts its armature 69 to withdraw the holding dog 70 from engagement with the ratchet 64. The spring 63, against the force of which the magnet 67 turned the shaft 62, is then free to unwind to place the curved ends of the spreader in engagement with the pins 53 and 55, assuming that the lever 57 is in neutral position. These pins then hold the rods 43 and 44 against movement. If the magnet 67 should be given more than the predetermined number of impulses, the pin 71 upon the ratchet will engage the plate 72 which is journaled upon the shaft 62, the plate being thereby turned to bring the arm 73 thereon into engagement with the detent 74 upon the armature 69, the arm 73 then depressing the armature 69 to disengage the dog 70 from the ratchet 64, whereupon the spring 63 will unwind and lock the pins 53 and 55 in engagement with the shafts to which they pertain. When the gear shifting mechanism has been unlocked by the magnet 67 the shaft 62 will bring the switch member 17 into engagement with the contacts 15 and 16, thereby closing the ignition circuit of the engine, it being understood that the switch member 17 is mounted upon the shaft 62 to turn therewith.

The switching mechanism for governing the circuits of the unlocking magnet 67 and the locking magnet 68 is diagrammatically illustrated in Fig. 1, and is desirably constructed as illustrated in Figs. 2 to 9 inclusive. The switch shown is inclusive of a cylindrical casing 76 closed at one end by a disc of insulation 76' and assembled at its other end with a mounting plate 77 which may be attached, for example, to the dashboard of an automobile. The disc 76' also constitutes a contact carrier, as will appear, and is preferably assembled with the casing by means of bayonet pins 78 provided thereon that are received in bayonet slots 79 provided in the casing. A lock is provided which has an enclosing casing 80 that is in fixed relation with the casing 76. A plurality of inwardly spring pressed locking plungers 81 are carried by the shell 82 of the lock, this shell and the lock casing 80 being in fixed relation. A lock barrel 83 carries tumblers 84 that are respectively aligned with the plungers 81. When the key 85 is inserted said tumblers and plungers meet where the barrel 83 engages the shell 82, permitting the key to turn said barrel. This barrel is received within the central opening of an insulating disc 86 which constitutes a contact actuator, as will appear.

A metallic contact ring 87 is assembled with the disc 86 by means of the spring barrels 88 which are in fixed relation with said ring 87 and which are in sliding engagement with the disc 86. These spring barrels contain spring pressed plungers 88' which are thrust forwardly to engage the disc 86. The springs 88² that press upon said plungers forwardly, also press upon the rear ends of the barrels, these barrel ends constituting contacts 89, 90, 91, and 92, diagrammatically indicated in Fig. 1 as fingers projecting radially from the ring but in practice desirably projecting from the rear flat face of the ring.

A triangular metallic plate 93 is formed with a contact 94 that is located upon the common axis of the lock barrel 83, the disc 86 and ring 87, this contact 94 being in constant engagement with the terminal contact 95 carried by the insulating disc 76', which not only serves to close the casing 76 but also serves as a contact carrier. The metallic contact plate 93 also carries another contact 96 which is brought into and out of engagement with the segmental metallic contact 97 that is coaxial with the barrel 83, the plate 93 being also assembled with the disc 86 by means of the spring barrels 98 carried by the plate 93, these spring barrels entering openings in the disc 86 and having sliding engagement with this disc. Forwardly spring pressed plungers 99 are contained in the barrels 98, these plungers pressing upon the disc 86 and forcing the contacts 94 and 96 into engagement with their complements. The contacts 94 and 96 desirably project from the rear face of the plate 93. For clearness of illustration the contact 96 is shown in Fig. 1 as being in the form of a finger projecting radially from the plate 93. The contact carrier 76' has a group of contacts 100, 101, 102, and 103, located in the circle of rotation of the contacts 89, 90, 91 and 92, the contacts 100 to 103 being accessible for engagement upon the inner face of the contact carrier 76' and being electrically connected by a segmental metallic strap 104 upon the rear face of said contact carrier. Another group of contacts 105, 106, 107 and 108 are also in the circle of rotation of the contacts 89 to 92, these contacts 105 to 108 being also accessible for engagement upon the inner face of the contact carrier and being electrically connected by a metallic strap 109 on the rear face of said contact carrier.

When the key 85 is inserted the contact actuator 86 may be turned thereby in a uniform direction so that the contacts 89 to 92 inclusive may each sweep over and engage each of the contacts 100 to 103 inclusive and each of the contacts 105 to 108 inclusive, this movement being clockwise as viewed from the front of the switch and counterclockwise as viewed in Fig. 1. When the key 85 is withdrawn the plungers 81 enter the lock barrel 83 to hold this lock barrel from rotation and, through the medium of the lock barrel, to hold the contact actuator 86 from rotation. In this adjustment the circuit is opened at 96, 97, as diagrammatically illustrated in Fig. 1. When the key is inserted the lock barrel 83 is released whereupon the key is turned clockwise as viewed in Figs. 3 and 6, to turn the contact actuator 86 and the contact plate 93 clockwise as viewed in these figures, but counterclockwise as viewed in Fig. 1. The first result is to connect the contacts 96 and 97, whereby a circuit section is established tracing from the ground to the contact 97, the contact 96, the body of the plate 93, the contact 94, the contact 95, and the conductor 110. A conductor 111 connects conductor 110 with the metallic strap 109, the unlocking magnet 67 being included in the conductor 111. A conductor 112 is connected with the conductor 110, this conductor 112 being grounded through the locking magnet 68. When the contacts 96 and 97 are initially engaged no circuit is entirely complete, but when the key is moved further, the contacts 101 and 89 are engaged and contacts 91 and 108 are engaged, whereupon the grounded battery 14 is connected with the conductor 111, this battery being connected with the metallic strap 104 by the conductor 113, to complete the circuit of the unlocking magnet 67. This unlocking magnet is energized to move the segmental ratchet 64 one tooth space to turn the shaft 62 to a corresponding extent against the force of the gear locking spring 63. When the key 85 is moved further the circuit thus established is broken to restore the pawl 65. The ratchet 64, however, is held by the dog 70. When the key 85 is moved a little further the contacts 89 and 102 are connected, contacts 90 and 100 are connected, and contacts 91 and 107 are connected, whereupon the unlocking magnet 67 is again energized to move the ratchet 64 another tooth space. In like manner, as the key 85 is continued to be turned, the contacts 89 and 103 are connected, contacts 90 and 101 are connected, contacts 91 and 106 are connected, and contacts 92 and 108 are connected, again to energize the magnet 67; the contacts 90 and 102 are connected, the contacts 91 and 105 are connected, and contacts 92 and 107 are connected again to energize the magnet 67; the contacts 90 and 103 are connected, and contacts 92 and 106 are connected to again energize the magnet 67; the contacts 91 and 100 are connected, and contacts 92 and 105 are connected, again to energize the magnet 67; contacts 91 and 101 are connected and contacts 89 and 108 are connected, again to energize the magnet 67; and contacts 91 and 102 are connected, contacts 92 and 100 are connected, and contacts 89 and 107 are connected, whereupon the magnet 67 is given its final energization.

The contact 96 is now at the upper end of the contact 97. A slight further movement of the key 85 will bring the contact 96 out of engagement with the contact 97 to open the circuit between the ground that is connected with the contact 97 and the conductor 110. The magnet 67 is thereupon released but the dog 70 still continues to hold the ratchet 64. As a consequence of the intermittent movements of the shaft 62 effected by the magnet 67, the spreader 61 is moved to a position in which the two pins 53 and 55 may together function similarly to the pin 51 permitting any desired combination of gearing. This condition is manifested to the operator of the automobile by means of the spring pressed plunger 114 upon the actuator 86 which clicks in its pocket 115 formed in the front end wall of the casing 76. Whenever the circuit of the unlocking magnet 67 was closed, a conductively continuous connection between the magnet 68 and the battery 14 was also established, but the magnet 68 was prevented from being energized due to the shunted ground connection extending from the contact 97. In order that the locking magnet 68 will not be energized when the circuit of the unlocking magnet 67 is finally broken by the separation of the contacts 96 and 97, the ring 87 should be disconnected from the battery 14 before the contact 96 leaves the contact 97, the ring 87 being so physically related to the contact plate 93 that this result will occur.

When it is desired to lock the gear shift lever 57 in neutral position, the locking magnet 68 is energized to permit the spring 63 to turn the shaft 62 to an extent sufficient to place the spreader 61 lengthwise between the pins 53 and 55. This result is secured by turning the key 85 in its previous direction a sufficient distance to connect the contact 91 with the contact 103, contact 92 with contact 101, to connect contact 89 with 106, and contact 90 with contact 108 whereupon the circuit for the locking magnet 68 is established. The circuit for the unlocking magnet 67 is also established but this magnet is not affected when magnet 68 is energized, the latter magnet being of sufficiently less resistance than magnet 67 as to shunt magnet 67. Turning of the key 85 is desirably thereafter continued until the spring pressed plunger 114 clicks into the pocket 116 upon the front end wall of the casing 75. During this further movement of the key 85 the locking magnet 68 is incidentally intermittently energized with no effect.

Changes may be made without departing from my invention.

Having thus described my invention, I claim:

1. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, an oblong spreader rotatable between said members effective in one rotated position thereof to force said members into engagement with the stop formations on said rods and in another rotated position thereof permitting either member to move out of engagement with its related stop formation, an electromagnetically operated pawl and ratchet mechanism for rotating said spreader, and means controlling the operation of said mechanism.

2. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, an oblong spreader rotatable between said members effective in one rotated position thereof to force said members into engagement with the stop formations on said rods and in another rotated position thereof permitting either member to move out of engagement with its related stop formation, spring means constantly tending to rotate said spreader to a position in which it forces said members into engagement with said stop formations, a pawl and ratchet mechanism operable intermittently to rotate said spreader step by step to a position in which either member is permitted to move out of engagement with its related stop formation, and means controlling the operation of said mechanism.

3. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, an oblong spreader rotatable between said members effective in one rotated position thereof to force said members into engagement with the stop formations on said rods and in another rotated position thereof permitting either member to move out of engagement with its related stop formation, means constantly tending to rotate said spreader to a position in which it forces said members into engagement with said stop formations, mechanism operable to rotate said spreader step by step to a position in which either member is permitted to move out of engagement with its related stop formation, and means controlling the operation of said mechanism.

4. In combination with a sliding gear transmission including a pair of spaced, parallel, longitudinally movable gear shift rods provided on adjacent faces with stop formations; a pair of members positioned between said rods movable in a direction transversely of the latter into and out of engagement with the stop formations thereon to prevent and permit longitudinal movement of said rods, respectively, an oblong spreader rotatable between said members effective in one rotated position thereof to force said members into engagement with the stop formations on said rods and in another rotated position thereof permitting either member to move out of engagement with its related stop formation, means constantly tending to rotate said spreader to a position in which it forces said members into engagement with said stop formations, mechanism operable to rotate said spreader step by step to a position in which either member is permitted to move out of engagement with its related stop formation, means operable to hold said spreader against rotation during the intervals between the intermittent operations of said mechanism, and electro-magnetic means for releasing said holding means.

In witness whereof, I hereunto subscribe my name.

HARRY A. DOUGLAS.